Patented Sept. 21, 1954

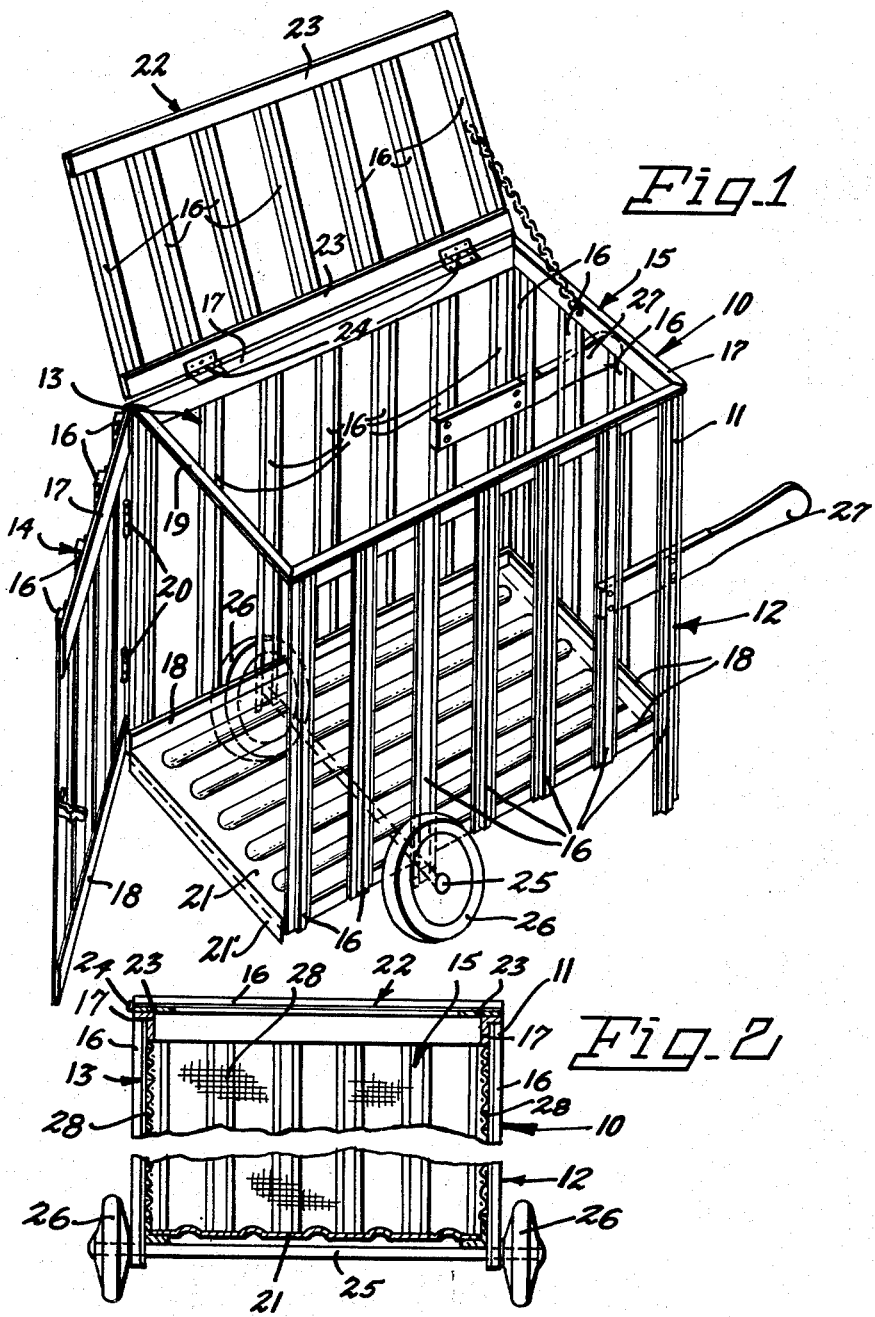

2,689,745

UNITED STATES PATENT OFFICE 2,689,745

REFUSE CART

Ralph M. Rosenberry, Spokane, Wash.

Application April 7, 1953, Serial No. 347,214

1 Claim. (Cl. 280—47.26)

My present invention is a refuse cart which may be manually mobilized and employed in a great number of uses.

One object of the invention is to provide a cart having convenient means of loading and unloading its contents and one which is susceptible to manual mobilization.

Another object of the invention lies in the provision of a refuse cart having a collapsible or separable receptacle which may be knocked down for shipping or storage.

Another object of the invention lies in the provision of a refuse cart having a closed receptacle provided with a manually movable top, bottom and one side wall which may be selectively moved out of closing relation with the receptacle.

Another object of the invention lies in the provision of a refuse cart which is simple in construction, using a minimum number of parts and, therefore, one which is inexpensive and yet very handy for a great number of uses.

These and other objects of the invention will become apparent during the course of the following description.

In the accompanying drawings, forming a part of this specification, and in which like numerals are employed to designate like parts;

Figure 1 is a perspective view of an embodiment of the preferred form of my improved refuse cart; and Figure 2 is a transverse cross section taken through the cart, with the receptacle closed.

The cart, indicated in general by the numeral 10, basically is a wheeled, manually movable, normally closed receptacle, and in particular comprises a barred receptacle 11 defined by separable side walls 12 and 13, front wall 14, and rear wall 15. Each wall is constructed of a plurality of horizontally spaced vertical bars 16 united at their top and bottom end portions by means of upper and lower brace members 17 and 18.

As illustrated in the drawing, the front end wall upper and lower brace members are mere flat bars, while the other walls are provided with angle members. The side walls 12 and 13 and the rear wall 17 are releasably secured together at the meeting corners and are separable so the receptacle may be collapsed for transportation or storage. The front open end of the receptacle is provided with a horizontally disposed angle member 19 to tie the side walls together when the end wall 14 is in the open position. The end wall 14 is provided with hinges 20 along one vertical side edge; these hinges are secured to the side wall 13 to permit movement of the front wall 14 into and out of closing relation with the receptacle.

The lower brace members 18 are provided with their horizontal flanges disposed inwardly and a bottom plate 21 having a downwardly bent lip 21' on its forward end, is removably carried in the receptacle upon these flanges.

The lower edge of the front wall 14 is spaced above the upper surface of the plate 21 to a limited degree to permit the bottom 21 to be slid forwardly under the front wall 14 and removed from the receptacle.

The open top of the receptacle is provided with a closure or top 22 which is constructed of a plurality of bars 16 secured across their ends by means of brace members 23, the lower brace member 23 being provided with hinges 24, secured to a side wall upper brace member 17 to hinge the top, adapting it to be movable into and out of covering relation with the receptacle.

Selected ones of the vertical bars 16 spaced forwardly of the longitudinal center in the side walls, extend downwardly beyond the lower brace members 18 and carry a transversely disposed axle 25, upon the ends of which are journaled wheels 26.

Handles 27 are carried by the side walls 12 and 13 and extend rearwardly from the receptacle to be grasped by a person for manual mobilization.

To support the cart in horizontal position when unaccompanied, selected ones of the vertical bars 16 of the side walls or rear end wall 15 extend downwardly below the lower brace members 18, terminating at a point commensurate with the lower edges of the wheels 26.

For convenience of illustration, I have omitted screen or mesh wire from Figure 1; however, it is contemplated supplying this screen or mesh 28 to the inside faces of the walls and the top, and the cart may thus be used as an incinerator, the screen preventing sparks from flying. Also, the screen adapts the cart for carrying smaller particles than it ordinarily would carry.

I contemplate constructing the cart receptacle of such dimensions that it will accommodate two normal refuse cans. In this way, the refuse cans may be placed at a convenient location, the top may be easily raised to permit access to the cans and, when it is time for collection, the cart may be wheeled to the location from which the refuse is collected.

The cart may also be used for cleaning up refuse, such as leaves and trash, about a dwelling. The refuse may be loaded into the cart through the open top, the top then closed and the cart wheeled to a convenient location for burning. Since the cart is constructed completely of unburnable materials, the leaves and trash may be ignited in the cart and consumed therein. Afterwards, the bottom 20 may be removed and the bottom edge of the front wall 14 will wipe the ashes from the bottom as the bottom moves outwardly. If desired, the bottom may be removed prior to burning the contents.

Obviously, there are many other uses of the cart too numerous to describe in this work, but the present description is sufficient for one skilled in the art to practice the invention.

Having thus described my invention, I claim:

A refuse cart adapted to contain refuse cans, comprising a separable metal frame, having a plurality of vertical bars united at their top and bottom end portions to horizontally extending upper and lower brace members releasably secured together at adjoining corners, and defining a receptacle having side and end walls; a removable bottom in the frame and carried by the lower brace members; the front one of said end walls being hingedly united to one side wall and swingable outwardly to open one end of said receptacle; handles carried by the side walls and extending horizontally rearwardly from the end of said receptacle; a barred cover for said receptacle hingedly carried by one side wall; selected ones of said vertical bars spaced forwardly of the longitudinal center of the receptacle extending below the lower angle members and carrying wheels disposed in planes parallel with the longitudinal axis of the receptacle; and other selected ones of said bars spaced rearwardly of the longitudinal center of said receptacle extending downwardly a distance commensurate with the lower supporting edge of the wheels to support the cart in a horizontal position.

References Cited in the file of this patent

UNITED STATES PATENTS

| Number | Name | Date |
| --- | --- | --- |
| 1,048,741 | Paul et al | Dec. 31, 1912 |
| 1,847,004 | Grinter | Feb. 23, 1932 |
| 1,970,727 | Bates | Aug. 21, 1934 |
| 2,171,068 | Masters | Aug. 29, 1939 |